United States Patent [19]
Bentley

[11] 3,985,336
[45] Oct. 12, 1976

[54] DRIP IRRIGATION VALVE

[76] Inventor: Clarence Bentley, 9256 Stamps Ave., Downey, Calif. 90240

[22] Filed: July 16, 1975

[21] Appl. No.: 596,222

[52] U.S. Cl. ................................. 251/205; 137/498
[51] Int. Cl.² ........................ F16K 1/54; F16K 3/34
[58] Field of Search .......... 137/517, 538, 607, 525, 137/480, 498, 503, 504; 251/148, 205, 339; 239/109, 542, 547; 138/43, 46

[56] References Cited
UNITED STATES PATENTS

| | | | |
|---|---|---|---|
| 2,899,980 | 8/1959 | Loebel et al. | 138/46 |
| 2,980,392 | 4/1961 | Greenwood | 251/205 X |
| 3,735,777 | 5/1973 | Katzer | 137/517 X |
| 3,785,392 | 1/1974 | Baker | 251/205 X |
| 3,815,636 | 6/1974 | Menzel | 138/43 |
| 3,825,224 | 7/1974 | Remane | 138/46 X |

*Primary Examiner*—William R. Cline
*Attorney, Agent, or Firm*—Gordon L. Peterson

[57] ABSTRACT

A drip irrigation valve comprising an outer member having a passage, an inner member receivable in the passage, a groove in one of the members, and a seal carried by the other of the members. Water can be admitted to the passage on one side of the seal. The seal cooperates with the groove to define a restricted flow path. The seal is deformable under fluid pressure into the groove to further restrict the flow path thereby making the valve pressure compensating. The groove is tapered or otherwise has regions of different cross sectional areas so that the flow rate through the flow path can be established by the relative axial positions of the inner and outer members.

16 Claims, 6 Drawing Figures

U.S. Patent  Oct 12, 1976  3,985,336
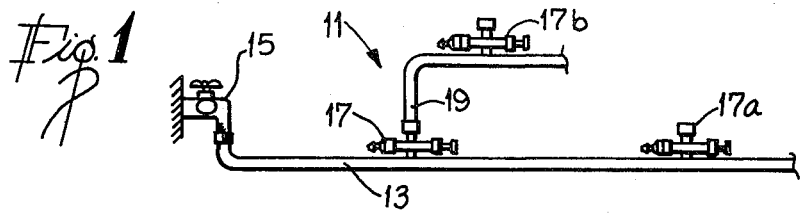
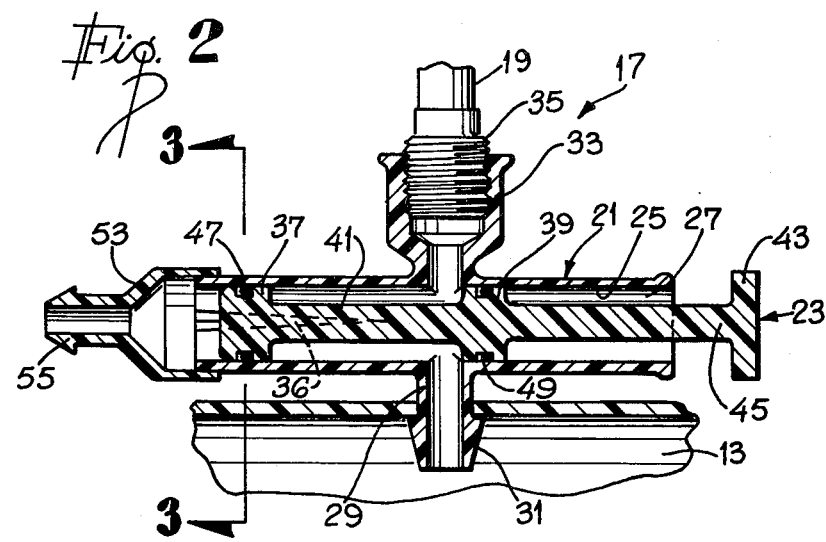
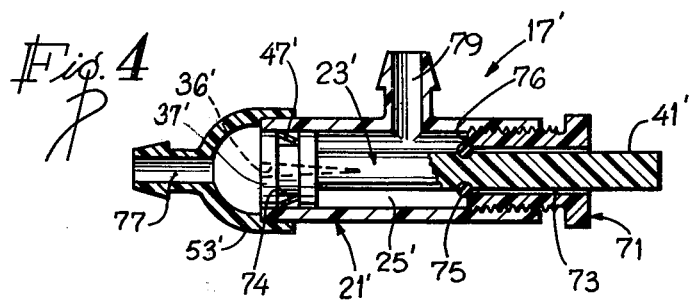
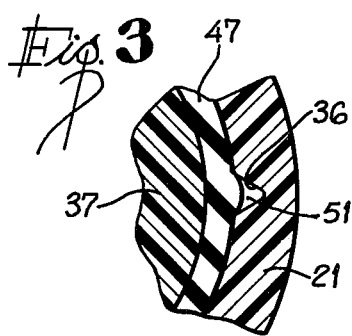
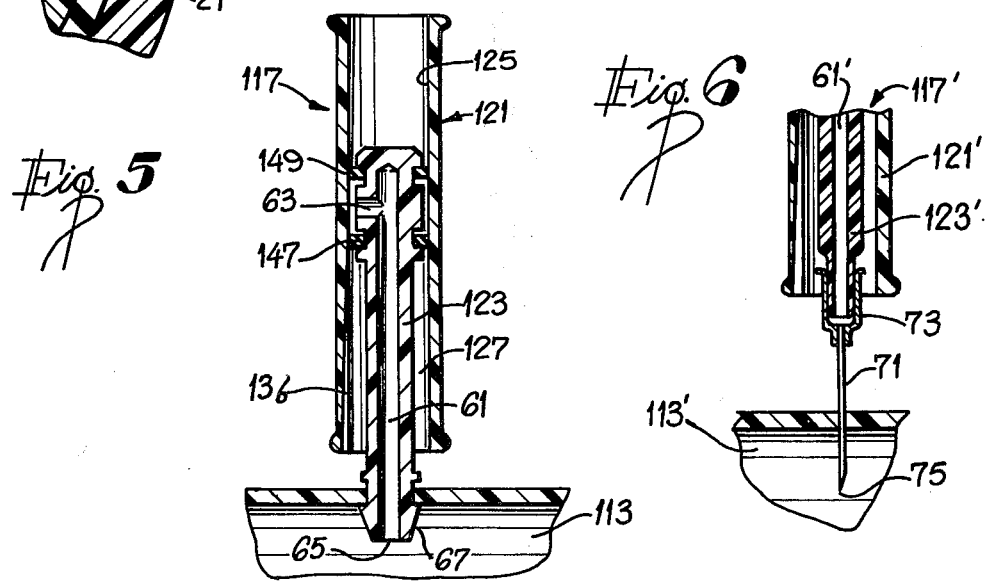

DRIP IRRIGATION VALVE

BACKGROUND OF THE INVENTION

Drip irrigation involves slowly metering various agricultural fluids, such as water, adjacent each plant which is to be grown. Normally, the metering of these fluids is carried out over a relatively long time period. Drip irrigation conserves water, minimizes weed growth and enables various agricultural liquids such as fertilizers to be fed through the irrigation system.

It is very important that the flow rate for drip irrigation systems be adjustable. For example, where drip irrigation is used in an orchard, more water must be applied as the trees grow. A conventional technique is to increase the number of emitter valves at the base of each of the trees as the trees grow. However, this unnecessarily duplicates the emitter valves and require significant labor cost to install the additional valves.

Valves which can be used to adjust the flow rate are not novel per se, as evidenced, for example, by Prosser U.S. Pat. No. 3,322,145 and Toeppen U.S. Pat. No. 3,341,168. However, neither of these patented valves is a drip irrigation valve and both are relatively complex.

With drip irrigation, it is important that the water be accurately metered. Unfortunately, water sources often provide water at fluctuating pressures, which, if ignored, would significantly effect flow rate onto the plant. In addition, when fields and irrigation lines are on a slope, more pressure is available at the lower elevations than at the higher elevations.

To provide pressure control, master pressure regulators can be used, but these increase the cost of the irrigation system. Pressure compensating emitter valves, such as the valves shown in Rondas U.S. Pat. No. 3,693,888 can be used. However, the patented valve has minute passages which are subject to clogging. In addition, the patented construction has no means for manually adjusting the flow rate.

SUMMARY OF THE INVENTION

My copending application Ser. No. 546,548 filed on Feb. 3, 1975 and entitled FLOW CONTROL VALVE shows several specific embodiments of pressure compensating emitters in which the flow rate is adjustable by a rotary member. The present invention presents a drip irrigation valve which provides for flow rate adjustment by relative axial movement of inner and outer members. The drip irrigation valve of this invention may also have pressure compensating features. As used herein with reference to drip irrigation valves, the expression "pressure compensating" means an ability to increase the restriction to flow in response to inlet pressure increases. The expression "pressure compensating" as used herein does not necessarily mean that the flow rate through the valve will be totally immune to inlet pressure fluctuations.

A valve constructed in accordance with the teachings of this invention may include an outer member having an inner surface defining a passage and an inner member having an outer surface with the inner member being receivable in the passage of the outer member and with the surfaces being generally in confronting relationship.

To provide a flow restriction through the passage, one of the members has a groove in the surface thereof and a seal is carried by the other of the members. For convenience, the drip irrigation valve is described with the groove being in the outer member and the seal being carried by the inner member; however, it should be understood that the present invention also contemplates that the seal and groove can be on the outer and inner members, respectively, if desired.

The seal is engageable with the surface of the passage in sealing relationship to form a fluid barrier. The members are relatively axially movable so that the groove can extend through the fluid barrier to provide a restricted flow path through the fluid barrier.

To permit the flow rate through the valve to be manually adjusted, the groove has a plurality of regions each of which has a different cross sectional area. For example, the groove may be tapered in width and/or depth, or it may contain dams or orifices along its length. Accordingly, the relative position of the seal and the groove determines which of the regions of the groove will confront the seal, and this determines, at least in part, the cross sectional area of the flow path.

In order that the flow rate can be adjusted in response to relative axial movement between the inner and outer members, the groove extends in a first direction and at least one component of the first direction extends axially of the outer member. Although the groove may extend helically or have a circumferential component, it can, for the sake of simplicity, be an axially extending groove.

The drip irrigation valve can very simply and inexpensively be provided with pressure compensating features. The pressure drop which occurs across the restricted flow path also acts on the seal and tends to deform the same. By utilizing a resilient seal, the pressure differential axially compressively loads the seal, and this results in radial expansion of the resilient seal. The seal will expand radially into any cavity which is presented to it, and one such cavity is the groove. Thus, should the pressure differential across the seal increase as a result of an increase in inlet pressure, the seal will be further axially compressed and further radially expanded into the groove to provide a greater restriction to flow through the flow path. conversely, a drop in inlet pressure will allow radial contraction of the seal out of the flow path to enlarge the flow path. By appropriately selecting the resilience of the seal, various different pressure compensating effects can be obtained.

If desired, the resilient seal can be a cup seal. With this arrangement some of the pressure differential acts more directly to urge the seal into the groove.

A fluid such as water is admitted to one side of the seal and this may be accomplished, for example, by an opening in the wall of the outer member or by a passage extending through the inner member and opening at the peripheral surface of the inner member. A discharge opening on the other side of the flow path can be provided, for example, by leaving one end of the outer member open.

One feature of the invention is that flow rate adjustment and pressure compensating features are obtained in a drip irrigation valve which may comprise only two parts and appropriate seals. The two parts are the outer and inner members both of which can be molded of plastic material.

Although only one seal is required, a second seal can be used to seal off the opposite end of the inner member. Fluid is then introduced to the passage between the two seals. The present invention also provides for a shutoff position in which there is no flow through the flow path and a bypass so that some of the fluid passing through the valve goes to the flow path while other portions of the fluid can be directed to additional drip irrigation valves.

The outer member may be in the form of a tube. To permit adjustment in the relative axial positions of the inner and outer members, at least one end of the inner member preferably extends outwardly beyond one end of the outer member. In one form of the invention a tubular needle is attached to the inner member. This facilitates the mounting of the drip irrigation valve on a penetrable fluid conduit and establishes fluid communication between the interior of the conduit and the passage in the outer member.

The invention can best be understood by reference to the following description taken in connection with the accompanying illustrative drawing.

BRIEF DESCRIPTION OF THE DRAWING

FIG. 1 is a diagrammatic illustration of a drip irrigation system utilizing drip irrigation valves of the present invention.

FIG. 2 is a longitudinal sectional view through one form of drip irrigation valve constructed in accordance with the teachings of this invention.

FIG. 3 is an enlarged fragmentary sectional view taken generally along line 3—3 of FIG. 2.

FIG. 4 is a longitudinal sectional view of a second embodiment of the drip irrigation valve constructed in accordance with the teachings of this invention.

FIG. 5 is a longitudinal sectional view of a third embodiment of drip irrigation valve constructed in accordance with the teachings of this invention.

FIG. 6 is a fragmentary sectional view illustrating means for mounting the drip irrigation valve of FIG. 5 on a penetrable conduit.

DESCRIPTION OF THE PREFERRED EMBODIMENTS

FIG. 1 shows a drip irrigation system 11 which includes a main conduit 13, a main valve 15 for controlling flow through the main conduit, and identical drip irrigation valves 17, 17a, and 17b. The drip irrigation valves 17 are mounted on the main conduit 13 and a branch conduit 19 provides fluid communication between the drip irrigation valves 17 and 17b. With the main valve 15 open, each of the drip irrigation valves 17, 17a and 17b permits the escape of drops of fluid.

With reference to FIG. 2, the valve 17 includes an outer member 21 in the form of an open ended tube and an inner member 23. The outer member 21 has an inner surface 25 which defines an axial cylindrical passage 27 which is open at both ends and which extends completely through the outer member.

The outer member 21, which may be integrally molded from a suitable plastic material, has an inlet branch 29 which is adapted for attachment to the conduit 13 in the usual manner by a barb 31. The outer member 21 also has an outlet branch 33 which can be plugged or suitably attached, as by a threaded coupling 35, to the branch conduit 19.

A tapered groove 36 is formed in the inner surface 25 and extends from a point just to the left (as viewed in FIG. 2) of the intersection of the inlet branch 29 with the outer member 21 to the left end of the outer member. Although the groove 36 could be of various different configurations, in the embodiment illustrated, it extends axially of the outer member 21. The groove 36 has a plurality of regions therealong with each of the regions having a different cross sectional area. Although the different cross sectional area of these regions could be provided in different ways, in the embodiment illustrated, the groove 36 progressively widens and deepens as it extends toward the left end of the outer member 21. Thus, the groove 36 is of progressively increasing cross sectional area as it extends axially outwardly.

The inner member 23 is preferably integrally molded from plastic material. The inner member includes axially spaced lands 37 and 39 joined by a stem 41 and a knob 43 joined to the land 39 by a stem 45. The lands 37 and 39 are cylindrical and sized to be slidably received in the passage 27. The knob 43 is of enlarged cross sectional area and is adapted to lie outside of the outer member 21. The knob can manually grasped to move the inner member 23 axially relative to the outer member 21.

Resilient annual seals 47 and 49, which may be elastomeric O-rings, are mounted on the lands 37 and 39, respectively. The seal 49 prevents leakage of fluid out the righthand end of the outer member 27. The members 21 and 23 are axially positionable so that the seal 47 extends across the groove 36 to define a restricted flow path 51 as shown in FIG. 3.

The cross sectional area of the flow path 51 controls the flow rate through the valve 17. The cross sectional area of the flow path 51 can be manually adjusted by moving the inner member 23 axially with respect to the outer member 21 to place the seal 47 contiguous a region of the groove 36 of a different cross sectional area. In this manner, the flow rate through the valve 17 can be adjusted.

In addition, the valve 17 has pressure compensating features. The pressure drop across the seal 47 axially compressively loads the seal. The elastomeric material of the seal 47 flows under compression into whatever voids are presented to the seal. Because the groove 36 is open to the seal 47, some of the elastomeric material of the seal flows radially outwardly under pressure into the groove 36. Accordingly, if inlet pressure to the valve 17 increases, the pressure drop across the seal 47 and the axial compressive load on the seal 47 increase. This causes additional radial expansion into the groove 36 to further restrict flow path 51. Thus, the cross sectional area of the flow path 51 tends to decrease with an increase in pressure upstream of the seal 47 to thereby provide a pressure compensating feature. Conversely, a decrease in inlet pressure reduces the restriction provided by the flow path. The degree to which pressure compensation is achieved will depend on ease with which the seal 47 can be radially expanded into the groove 36, i.e., the resilience of the seal, and this can be adjusted by those skilled in the art to suit particular design requirements.

By pulling the inner member 23 to the right as viewed in FIG. 2 until the seal 47 no longer confronts any portion of the groove 36, the flow through the groove can be completely shut off. Water can flow from the conduit 13 to the conduit 19 via the inlet branch 29, the passage 27, and the outlet branch 33.

In the embodiment illustrated, the valve 27 also includes a separately molded outlet section 53 which is cemented or otherwise attached to the left hand end of the outer member 21 to form an extension of the outer member. The outlet section 53 is optional and has a barb 55 so that it can be attached to another conduit, if desired. To flush out the valve 17, the inner member 17 is either withdrawn completely from the passage 27 or moved to the left to place the seal 47 in the enlarged passage section formed by the section 53. In either event flushing is very easily accomplished.

FIG. 4 shows a valve 17' which is similar to the valve 17 (FIGS. 1–3). Portions of the valve 17' corresponding to portions of the valve 17 are designated by corresponding primed reference numerals.

One difference between the valves 17' and 17 is that a threaded bushing 71 is mounted in the right end of the outer member 21' of the valve 17'. The inner member 23' has a land 37' and a seal 47', but it does not have land 39 and seal 49 as does the inner member 23 (FIG. 2). The seal 47' is constructed of resilient elastomeric material, and it has a cup or recess 74 which opens toward the high pressure side of the seal. The stem 41' extends through a passage 73 of the bushing 71. A seal 75 is carried by the stem 41' and is adapted to abut an inner end face 76 of the bushing 71.

In use water enters an inlet 77 of the section 53' and acts against the left hand end face of the land 37'. This moves the inner member 23' to the right as viewed in FIG. 4 to place the seal 75 into contact with the inner end face of the bushing 71. The seal 75 and the end face 76 of the bushing 71 serve as a stop and an abutment, respectively, to axially position the inner member 23' relative to the outer member 21'. The seal 75 also seals the passage 73 from the passage 21'. Water flows through the groove 36' from the wide end of the groove toward the narrow end and out an outlet 79.

The relatively high pressure fluid enters the recess 74 and tends to expand the seal 47' radially outwardly. This means that the seal 47' is expanded into the groove 36' an amount which is a function of the pressure drop across the seal 47'. The pressure drop is in turn a function of the inlet pressure. Accordingly, a pressure compensating effect is obtained.

To change the flow rate through the valve 17', the bushing 71 is manually turned to advance or retract it relative to the outer member 21'. As the fluid under pressure from the inlet 77 always maintains the seal 75 against the inner end face 76, movement of the bushing axially displaces the inner member 23' relative to the outer member 21'. Accordingly, the relative axial positions of the members 21' and 23' are positively established and positively maintained.

To flush the valve 17', the outer portion of the seal 41' is pushed inwardly to move the land 37' and the seal 47' into the enlargement formed by the section 53'. When flushing is completed, the user releases the stem 41' whereupon the inlet fluid pressure automatically returns the inner member 23' to the position previously established by the cooperation between the seal 75 and the inner end face 76. In other words, the valve 17' has a memory which permits the user to adjust the relative axial positions of the inner member 23' and the outer member 21' as for flushing and thereafter the inner and outer members automatically return to the previously established relative axial position. For this reason, a flow once established by setting of the bushing 71 is not destroyed simply because the valve needs to be flushed.

FIG. 5 shows a drip irrigation valve 117 which is similar to the valve 17. Portions of the valve 117 corresponding to portions of the valve 17 are designated by corresponding reference numerals preceded by the numeral 1. A primary difference between the valves 17 and 117 is the manner in which fluid is admitted to the passage of the outer member. Specifically, the valve 117 has an inner member 123 which has an axial passage 61 which terminates in a radial outlet 63 located between seals 147 and 149 and an inlet 65 located at the remote end of the inner member. A barb 67 is provided on the inner member 123 to facilitate attachment of the inner member to a conduit 113 in a conventional manner. The use of the passage 61 eliminates the need for a separate inlet branch such as the inlet branch 29 (FIG. 2). The seals 147 and 149 are carried by the inner member 123. In the embodiment illustrated, the seals 147 and 149 are constructed of resilient elastomeric material and are of generally rectangular configuration in cross section.

The outer member 121 is in the form of a tube having both ends open. The outer member 121 has a surface 125 defining a cylindrical passage 127. An axial, tapered groove 136 which may be identical to the tapered groove 36 (FIG. 2) is provided in the surface 125.

The seals 147 and 149 extend across and cooperates with the groove 136 to define first and second flow paths, respectively, in the same manner discussed hereinabove with reference to FIGS. 2 and 3. Water from the flow paths formed by the seals 147 and 149 flows out of the lower and upper ends of the outer member 121, respectively. Flow rate thorugh both flow paths can be varied by moving the outer member 121 axially with respect to the inner member 123. In addition, the seals 147 and 149 cooperate with the groove 136 in the same manner described above with reference to FIGS. 2 and 3 to provide the valve 117 with pressure compensating features. By moving the outer member 121 downwardly the upper or narrow end of the groove 136 is eventually moved past the seal 147. This provides the valve 117 with a shut off position.

FIG. 6 shows a valve 117' which is identical to the valve 117 in every way except that a tubular needle in the form of a hypodermic needle 71 is attached to the lower end of the inner member 123' and the barb 67 (FIG. 5) is removed. Portions of the valve 117' corresponding to portions of the valve 117 are designated by corresponding primed reference numerals.

In the embodiment shown in FIG. 6, the lower end portion of the inner member 123' is of reduced cross sectional area and a sleeve 73 is used to attach the needle 71 to the inner member 123'. The needle 71 has a sharp point 75 and can be readily inserted through a penetrable wall of a conduit such as the plastic wall of the conduit 113'. Because the needle 75 is tubular and has an axial passage extending through it, it provides communication between the interior of the conduit 113 and the passage 61'. One advantage of the embodiment of FIG. 6 is the ease with which it can be mounted on the conduit 113'. A second advantage is that communication is automatically provided between the interior of the conduit 113' and the passage 61' in response to insertion of the needle into the conduit.

Although exemplary embodiments of this invention have been shown and described, many changes, modifications and substitutions may be made by those having ordinary skill in the art without the necessarily departing from the spirit and scope of this invention.

I claim:
1. A drip irrigation valve comprising:
an outer member having an inner surface defining a passage;

an inner member having an outer surface, said inner member being receivable in said passage of the outer member with said surfaces being generally in confronting relationship;

one of said members having a groove in said surface thereof, said groove having a plurality of regions with each of said regions having a different cross sectional area, said groove extending in a first direction, at least one component of said first direction extending axially of said one member;

a resilient deformable seal carried by the other of said members and engageable with the surface of said one member in sealing relationship to form a fluid barrier; said seal being deformable into the groove an amount which varies with the fluid pressure on the upstream side of said fluid barrier to make the valve pressure compensating;

means for admitting fluid to said passage on one side of the fluid barrier;

means for discharging fluid from said passage on the other side of said fluid barrier; and said members being relatively axially movable so that said groove can extend through the fluid barrier and provide a flow path through the fluid barrier whereby fluid can flow to the discharge means, said members being relatively movable to bring at least some of said regions of said groove adjacent the seal to vary the resistance to fluid flow through said flow path to thereby permit control of the flow rate through said flow path.

2. A valve as defined in claim 1 wherein said outer member is said one member.

3. A valve as defined in claim 1 wherein said seal is a first seal, said valve includes a second seal spaced axially from said first seal, said admitting means admitting fluid to a location between said seals at least for some relative axial positions of the members.

4. A valve as defined in claim 3 wherein said valve means includes a bypass outlet communicable with a location between said seals whereby some of the fluid from the admitting means can pass through the bypass outlet and other of the fluid from the admitting means can pass through said flow path in at least some relative positions of the members.

5. A valve as defined in claim 1 including cooperating means on said members responsive to the members being in a first relative axial position for blocking flow from said admitting means to said discharge means.

6. A valve as defined in claim 5 wherein said outer member is said one member, said seal is first seal, said valve includes a second seal spaced axially from said first seal, said admitting means admitting fluid to a location between said seals at least for some relative axial positions of the members.

7. A valve as defined in claim 1 wherein said seal includes a resilient cup seal opening toward the upstream side of said fluid barrier.

8. A valve as defined in claim 1 wherein said admitting means includes a passage in said inner member.

9. A valve as defined in claim 8 wherein said outer member is said one member and said valve includes a needle having a relatively sharp point and a passage extending through the needle, said needle being coupled to said inner member with the passage of said needle being in communication with the passage of the inner member, said needle being insertable into a penetrable fluid conduit to place the interior of such conduit in fluid communication with said fluid barrier.

10. A valve as defined in claim 1 wherein said admitting means includes a needle having a relatively sharp point and a passage extending through said needle, said passage of said needle being in communication with the passage of said outer member on said one side of the fluid barrier.

11. A valve as defined in claim 1 wherein said outer member includes a tube, said admitting means includes an opening in said tube, said inner member extending out beyond one end of said tube whereby said inner member can be moved manually relative to said outer member.

12. A valve as defined in claim 1 wherein said outer member is said one member, said outer member includes a tube, said inner member includes first and second axially spaced lands, said seal is a first seal and is mounted on said first land, said valve includes a second seal on said second land spaced axially from said first seal, said admitting means admitting fluid to a location between said seals at least for some relative axial positions of the members, said admitting means including an opening in the wall of said tube, said members being relatively axially slidable to permit one of said lands to block said opening in the wall of the tube.

13. A valve as defined in claim 1 wherein the fluid from the admitting means urges the inner member in a first axial direction relative to the outer member, said valve including cooperating means on said members for stopping the relative axial movement in said first direction in a predetermined relative axial position.

14. A valve as defined in claim 1 including a bushing threadedly mounted on said outer member, said bushing having a passage extending therethrough, said inner member having a stem extending through said passage of said bushing, a stop carried by said stem and engageable with said bushing to limit the movement of said inner member relative to said outer member in one axial direction, said discharging means communicating with said passage of said outer member at a location intermediate said seal and said stop carried by said inner member.

15. A drip irrigation valve comprising:

an outer tubular member of plastic material having an outer surface and including first and second axially spaced lands, said inner member being receivable in said passage of the other member with said surfaces being generally in confronting relationship;

said outer member having a groove in said surface thereof, said groove having a plurality of regions with each of said regions having a different cross sectional area, said groove extending in a first direction, at least one component of said first direction extending axially of said outer member;

a first seal carried by the first land of said inner member and engageable with the surface of said outer member in sealing relationship to form a fluid barrier;

a second seal carried by said second land and spaced axially from the first seal;

means including an opening in the wall of the outer tubular member for admitting fluid to said passage between said seals at least for some relative axial positions of said members;

means for discharging fluid from said passage on the other side of said fluid barrier;

said groove being extendable through said fluid barrier to provide a flow path through the fluid barrier whereby fluid can flow to the discharge means;

said members being relatively axially slidable to bring at least some of said regions of said groove adjacent the seal to vary the resistance to fluid flow through said flow path to thereby permit control of the flow rate through said flow path, said members being relatively axially slidable to a position in which at least one of said lands locks said opening in the wall of the outer member; and one end of said outer member being open and said inner member extending out through said open end to facilitate axial movement of the inner member, said inner member being axially slidable completely out of said passage through said open end.

16. A valve as defined in claim 15 wherein one region of said passage is radially enlarged adjacent the downstream end of said groove, said members being relatively axially movable to position the first seal in the enlarged region of said passage to define a flushing position.

* * * * *